US010396839B2

(12) United States Patent
Cohen et al.

(10) Patent No.: US 10,396,839 B2
(45) Date of Patent: *Aug. 27, 2019

(54) ENHANCED RECEIVE SENSITIVITY FOR CONCURRENT COMMUNICATIONS

(71) Applicant: Intel IP Corporation, Santa Clara, CA (US)

(72) Inventors: Emanuel Cohen, Zichron Yaacov (IL); Nati Dinur, Haifa (IL)

(73) Assignee: Intel IP Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/176,322

(22) Filed: Oct. 31, 2018

(65) Prior Publication Data

US 2019/0068228 A1    Feb. 28, 2019

Related U.S. Application Data

(63) Continuation of application No. 14/230,235, filed on Mar. 31, 2014, now Pat. No. 10,128,879.

(51) Int. Cl.
*H04B 1/10* (2006.01)
*H04B 1/12* (2006.01)
*H04B 1/525* (2015.01)

(52) U.S. Cl.
CPC ............... *H04B 1/12* (2013.01); *H04B 1/109* (2013.01); *H04B 1/525* (2013.01)

(58) Field of Classification Search
CPC .................................. H04B 1/12; H04B 1/109
See application file for complete search history.

(56) References Cited

U.S. PATENT DOCUMENTS

| | | | |
|---|---|---|---|
| 4,968,967 A | * | 11/1990 | Stove ...................... G01S 7/038 342/165 |
| 5,235,612 A | | 8/1993 | Stillwell et al. |
| 5,995,567 A | | 11/1999 | Cioffi et al. |
| 6,088,581 A | | 7/2000 | Bickley et al. |
| 6,215,812 B1 | | 4/2001 | Young et al. |

(Continued)

FOREIGN PATENT DOCUMENTS

| | | |
|---|---|---|
| DE | 102008048756 A1 | 8/2009 |
| DE | 20201201372 | 1/2013 |
| EP | 2822189 A1 | 1/2015 |

OTHER PUBLICATIONS

Notice of Allowance dated Jun. 20, 2018 for U.S. Appl. No. 14/230,235.

(Continued)

*Primary Examiner* — Berhanu Tadese
(74) *Attorney, Agent, or Firm* — Eschweiler & Potashnik, LLC

(57) ABSTRACT

A system using multiple communication technologies for concurrent communication is disclosed. The system includes a loopback receiver, a receiver, and a noise remover component. The loopback receiver is configured to obtain a coupled signal and generate a noise signal from the coupled signal. The noise signal includes direct transmission noise. The receiver is configured to receive a chain receive signal and to provide a receive signal therefrom. The noise remover component is configured to generate a wanted receive signal from the noise signal and the receive signal.

20 Claims, 5 Drawing Sheets

(56) References Cited

U.S. PATENT DOCUMENTS

| | | | |
|---|---|---|---|
| 6,229,992 B1 | 5/2001 | McGeehan et al. | |
| 6,388,526 B1 | 5/2002 | Daniel et al. | |
| 6,539,204 B1 | 3/2003 | Marsh et al. | |
| 6,704,349 B1* | 3/2004 | Masenten | H04B 1/123 375/219 |
| 6,915,112 B1 | 7/2005 | Sutton et al. | |
| 7,058,364 B2* | 6/2006 | Atkinson | B01F 5/246 370/329 |
| 7,106,805 B2* | 9/2006 | Atkinson | B01F 5/246 375/295 |
| 7,203,466 B2* | 4/2007 | Muschallik | H04B 1/30 455/305 |
| 7,292,649 B2* | 11/2007 | Atkinson | B01F 5/246 375/316 |
| 7,412,217 B2 | 8/2008 | Boos | |
| 7,595,678 B2 | 9/2009 | Cao et al. | |
| 7,657,228 B2* | 2/2010 | Rubin | H04B 1/123 370/209 |
| 7,773,966 B2 | 8/2010 | So et al. | |
| 7,995,973 B2* | 8/2011 | Dent | H04B 1/525 375/260 |
| 8,054,921 B2* | 11/2011 | Jalfon | H04B 1/7097 375/346 |
| 8,289,837 B2 | 10/2012 | Kim et al. | |
| 8,306,480 B2* | 11/2012 | Muhammad | H04B 1/525 455/296 |
| 8,320,866 B2* | 11/2012 | Pratt | H04B 1/525 375/346 |
| 8,320,868 B2* | 11/2012 | Pratt | H04B 1/525 375/346 |
| 8,428,545 B1* | 4/2013 | Kaunisto | H03H 11/126 333/172 |
| 8,502,596 B1* | 8/2013 | Kaunisto | H03H 7/0153 327/553 |
| 8,744,363 B2* | 6/2014 | Dufrene | H04B 1/1036 455/296 |
| 8,755,756 B1 | 6/2014 | Zhang et al. | |
| 8,843,082 B2* | 9/2014 | Dufrene | H04B 1/525 370/277 |
| 8,880,096 B2* | 11/2014 | Rousu | G01S 19/235 455/456.1 |
| 8,917,204 B2 | 12/2014 | Trotta et al. | |
| 8,995,309 B2 | 3/2015 | Ma et al. | |
| 9,014,651 B2 | 4/2015 | Tujkovic et al. | |
| 9,160,387 B2 | 10/2015 | Mahoney et al. | |
| 9,231,712 B2 | 1/2016 | Hahn et al. | |
| 10,128,879 B2* | 11/2018 | Cohen | H04B 1/109 |
| 2002/0132597 A1 | 9/2002 | Peterzell et al. | |
| 2003/0054788 A1 | 3/2003 | Sugar et al. | |
| 2003/0156668 A1* | 8/2003 | Atkinson | B01F 5/246 375/345 |
| 2003/0157901 A1* | 8/2003 | Atkinson | B01F 5/246 455/76 |
| 2003/0157909 A1* | 8/2003 | Atkinson | B01F 5/246 455/130 |
| 2003/0157912 A1* | 8/2003 | Atkinson | B01F 5/246 455/234.1 |
| 2003/0157915 A1* | 8/2003 | Atkinson | B01F 5/246 455/306 |
| 2004/0087279 A1* | 5/2004 | Muschallik | H04B 1/30 455/73 |
| 2004/0127178 A1 | 7/2004 | Kuffner | |
| 2004/0198440 A1 | 10/2004 | Soliman | |
| 2005/0215198 A1 | 9/2005 | Fifield | |
| 2006/0019611 A1 | 1/2006 | Mages | |
| 2006/0079194 A1 | 4/2006 | Tired et al. | |
| 2006/0239341 A1 | 10/2006 | Marlett et al. | |
| 2007/0082617 A1 | 4/2007 | McCallister | |
| 2007/0298838 A1 | 12/2007 | Meiyappan et al. | |
| 2008/0107093 A1 | 5/2008 | Meiyappan et al. | |
| 2008/0143394 A1 | 6/2008 | Payrard et al. | |
| 2008/0187037 A1 | 8/2008 | Bulzacchelli et al. | |
| 2008/0198773 A1 | 8/2008 | Loh | |
| 2009/0061808 A1 | 3/2009 | Higgins | |
| 2009/0186582 A1* | 7/2009 | Muhammad | H04B 1/525 455/63.1 |
| 2009/0286569 A1* | 11/2009 | Rousu | H01P 1/213 455/553.1 |
| 2010/0130146 A1 | 5/2010 | Huang | |
| 2010/0159837 A1* | 6/2010 | Dent | H04B 1/525 455/63.1 |
| 2010/0197233 A1 | 8/2010 | Kim et al. | |
| 2010/0278085 A1 | 11/2010 | Hahn | |
| 2010/0279709 A1* | 11/2010 | Shahidi | H04B 1/3805 455/456.2 |
| 2010/0329158 A1* | 12/2010 | Sengupta | H03F 1/3211 370/278 |
| 2011/0075754 A1* | 3/2011 | Smith | H04B 1/109 375/285 |
| 2011/0175789 A1* | 7/2011 | Lee | H01Q 1/243 343/853 |
| 2011/0195672 A1* | 8/2011 | Pratt | H04B 1/525 455/78 |
| 2011/0195673 A1* | 8/2011 | Pratt | H04B 1/52 455/78 |
| 2011/0212696 A1* | 9/2011 | Hahn | H04B 1/525 455/83 |
| 2011/0256857 A1* | 10/2011 | Chen | H04B 1/525 455/422.1 |
| 2011/0312287 A1* | 12/2011 | Ramachandran | H04B 15/02 455/77 |
| 2012/0076237 A1* | 3/2012 | Cohen | H03F 1/3247 375/297 |
| 2012/0094617 A1* | 4/2012 | Tone | H04B 1/0057 455/78 |
| 2012/0163245 A1* | 6/2012 | Tone | H04B 1/525 370/277 |
| 2012/0263215 A1* | 10/2012 | Peng | H04B 1/0475 375/221 |
| 2012/0264381 A1* | 10/2012 | Eisenhut | H04B 1/406 455/90.1 |
| 2012/0282872 A1* | 11/2012 | Banwell | H04B 1/58 455/269 |
| 2013/0021955 A1* | 1/2013 | Duron | H04B 1/0475 370/297 |
| 2013/0064328 A1* | 3/2013 | Adnani | H04B 1/006 375/340 |
| 2013/0181521 A1* | 7/2013 | Khlat | H02M 3/07 307/31 |
| 2013/0196609 A1* | 8/2013 | Ancora | H04B 1/1036 455/78 |
| 2013/0208631 A1* | 8/2013 | Dufrene | H04B 1/1036 370/277 |
| 2013/0210347 A1* | 8/2013 | Ling | H04W 4/80 455/41.1 |
| 2013/0210375 A1* | 8/2013 | Dufrene | H04B 1/525 455/79 |
| 2013/0257483 A1* | 10/2013 | Bulzacchelli | H03K 3/012 327/53 |
| 2013/0336419 A1* | 12/2013 | Weinrib | H04B 1/1036 375/285 |
| 2014/0004810 A1* | 1/2014 | Cohen | H04B 17/102 455/115.3 |
| 2014/0073258 A1* | 3/2014 | Burchill | H04B 1/123 455/63.1 |
| 2014/0120969 A1* | 5/2014 | Sang | H04W 72/1215 455/501 |
| 2014/0141799 A1* | 5/2014 | Rousu | G01S 19/235 455/456.1 |
| 2014/0194071 A1* | 7/2014 | Wyville | H04B 1/525 455/73 |
| 2014/0194073 A1* | 7/2014 | Wyville | H04B 1/525 455/73 |
| 2014/0232468 A1* | 8/2014 | Hulbert | H04B 1/0475 330/293 |
| 2014/0235191 A1* | 8/2014 | Mikhemar | H04B 1/109 455/295 |
| 2014/0269863 A1* | 9/2014 | Fan | H04B 1/525 375/221 |

(56) References Cited

U.S. PATENT DOCUMENTS

| | | | | |
|---|---|---|---|---|
| 2014/0329484 A1* | 11/2014 | Lau | ............ | H03F 1/26 |
| | | | | 455/296 |
| 2014/0348032 A1* | 11/2014 | Hua | ............ | H04B 1/44 |
| | | | | 370/277 |
| 2015/0214996 A1* | 7/2015 | Cohen | ............ | H04B 1/62 |
| | | | | 370/328 |
| 2015/0280759 A1* | 10/2015 | Cohen | ............ | H04B 1/109 |
| | | | | 375/346 |
| 2015/0282099 A1* | 10/2015 | Laaser | ............ | H04W 52/243 |
| | | | | 455/67.13 |
| 2015/0312060 A1* | 10/2015 | Sinha | ............ | H04L 25/03057 |
| | | | | 375/233 |
| 2016/0112073 A1* | 4/2016 | Lum | ............ | H04B 1/0057 |
| | | | | 370/297 |

OTHER PUBLICATIONS

Non-Final Office Action dated Jan. 11, 2018 for U.S. Appl. No. 14/230,235.
Final Office Action dated May 3, 2017 for U.S. Appl. No. 14/230,235.
Non-Final Office Action dated Oct. 7, 2016 for U.S. Appl. No. 14/230,235.
Final Office Action dated Mar. 15, 2016 for U.S. Appl. No. 14/230,235.
Non-Final Office Action dated Jul. 28, 2015 for U.S. Appl. No. 14/230,235.

* cited by examiner

ENHANCED RECEIVE SENSITIVITY FOR CONCURRENT COMMUNICATIONS

REFERENCE TO RELATED APPLICATION

This application is a continuation of U.S. application Ser. No. 14/230,235 filed on Mar. 31, 2014, the contents of which are incorporated by reference in their entirety.

BACKGROUND

Generally, communication systems utilize a particular technology for exchanging information. At a first device, a transmitter uses the particular technology to generate and transmit a communication signal. At a second device, a receiver uses the particular technology to receive the communication signal.

However, communicating using only a single technology can be problematic. Many devices may utilize other communication technologies. As a result, the first and second devices are unable to communicate with them, which limit their usefulness.

One technique to overcome this limitation is to incorporate an additional communication technology into the devices. This permits the devices to communicate with other devices using other communication technologies.

However, incorporating different communication technologies into a single device can introduce inefficiencies, noise and impair performance.

DETAILED DESCRIPTION

Figure 1:
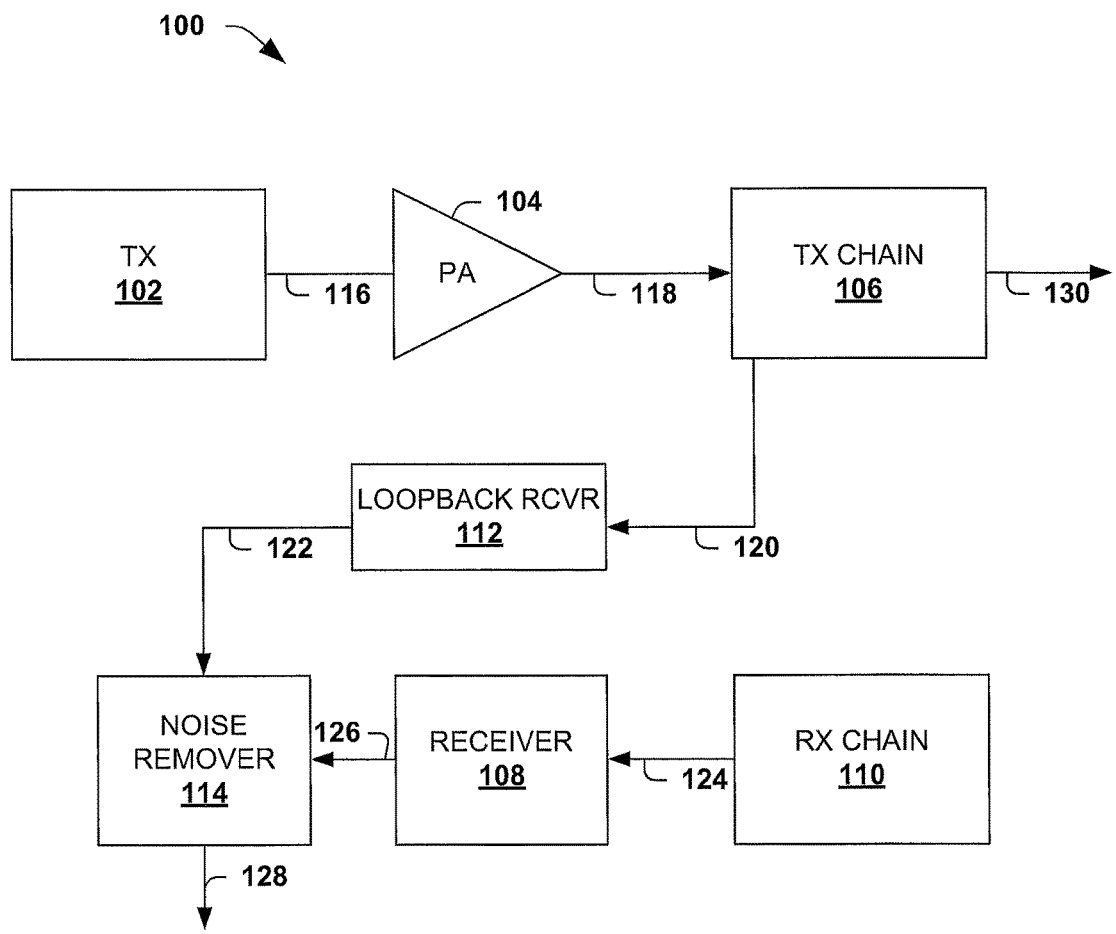
FIG. 1 is a block diagram illustrating a communication system having multiple communication technologies for concurrent communication.

The systems and methods of this disclosure are described with reference to the attached drawing figures, wherein like reference numerals are used to refer to like elements throughout, and wherein the illustrated structures and devices are not necessarily drawn to scale.

Increasingly, multiple communication devices utilizing multiple communication technologies are located on the same device or die. This permits a single device to utilize multiple communications technologies, such as WiFi and Bluetooth, at the same time.

Devices, such as smart phones and tablets, rely on communications in order to provide users a good experience. In order to enhance the experience, multiple communication technologies can be used concurrently. For example, two common communication technologies or standards are Bluetooth and WiFi (wireless internet). Devices that utilize Bluetooth and WiFi can communicate in more places and with more devices that devices that use only one of the technologies.

A challenge to using multiple communication technologies is concurrency or TX/RX concurrency issues. The concurrency issues occur due to interference and the like between using multiple technologies on a single device. For example, communication technologies that operate in the same bandwidth, such as WiFi and Bluetooth, which operate in the same 2.4 GHz band, can develop concurrency issues. In particular, transmitting with one technology, such as WiFi, can negatively impact receiving with another technology, such as Bluetooth. The impact can degrade receive performance, receiver sensitivity, range, and the like.

FIG. 1 is a block diagram illustrating a communication system 100 having multiple communication technologies for concurrent communication. The system incorporates noise cancellation to mitigate receiver degradation without substantially impacting transmission.

The system 100 includes a transmitter 102, an amplifier 104, a transmission chain 106, a loopback receiver 112, a noise remover 114, a receiver 108 and a receive chain 110. The system 100 mitigates receiver degradation by identifying and accounting for direct noise from a transmit signal or chain directly into the receive signal. As a result, receiver sensitivity and range is improved.

The transmitter 102 is configured to generate a transmit signal 116 using a transmission technology. The transmit signal 116 generally includes information or data for transmitting, such as for cellular communications and the like. The transmission technology is a communication technology, which can be based on a communications standard, such as Bluetooth, WiFi, UMTS, LTE, and the like.

The amplifier 104 adjusts the power or gain of the transmit signal 118 and is configured to generate an amplified transmit signal 118. The amplifier 104 can also introduce noise into the transmit signal 118 due to non-linearities of the amplifier 104.

The transmit chain 106 is configured to receive the amplifier transmit signal 118 and generates a transmit output signal 130. The transmit chain 106 includes one or more components for transmitting the signal 118 such as, filters, antenna, and the like. The transmit chain 106 is also configured to generate a coupled signal 120 based on the transmit output signal 130. The coupled signal includes components of the transmit signal 118 and components of a receive signal. A suitable coupler or other similar component can be utilized to generate the coupled signal 120. An example of a suitable coupler is described below.

The loopback receiver 112 is configured to receive the coupled signal and develop a noise signal 122. The loopback receiver 112 identifies or estimates noise from transmit and receive components of the coupled signal. The loopback receiver 112 may also utilize characteristics of the system, such as component attenuation, attenuation along varied paths, and the like. Additionally, the characteristics can also include phase and/or time delays. The identified noise includes noise directly introduced into the receive chain 110 by the transmit chain 106. The noise directly introduced is referred to as direct noise. There may be other noise present in the system, such as non-linearity at the receive chain 110, but this noise is typically substantially less than the direct noise.

The receive chain 110 is configured to provide a chain receive signal 124. The receive chain 110 includes one or more components for receiving signals including components, such as, antenna, filters, mixers, and the like. The chain receive signal 124 is impacted by the transmit signal 130, which directly introduces noise into the receive chain 110 and, as a result, the chain receive signal. In one example, the transmit signal 130 causes a signal reduction of 20 dB in the chain receive signal 124.

The receiver 108 is configured to obtain a receive signal 126 from the chain signal 124. The receiver 108 may include filtering and the like to process or extract the receive signal 126 from the chain signal 124.

The noise remover or cancellation component 114 is configured to obtain the receive signal 126 and the noise signal 122 and generate a wanted receive signal 128. The wanted receive signal 128 is substantial free from the identified or estimated noise as analyzed by the loopback receiver 112. In one example, the noise remover component 114 is configured to subtract the noise signal from the receive signal 126 to obtain the wanted receive signal 128.

Noise interference to the receive signal from generating the transmit signal 116 and the amplified transmit signal 118 can be substantial. In one example, the resulting noise is on the order of 30 dB.

Figure 2:
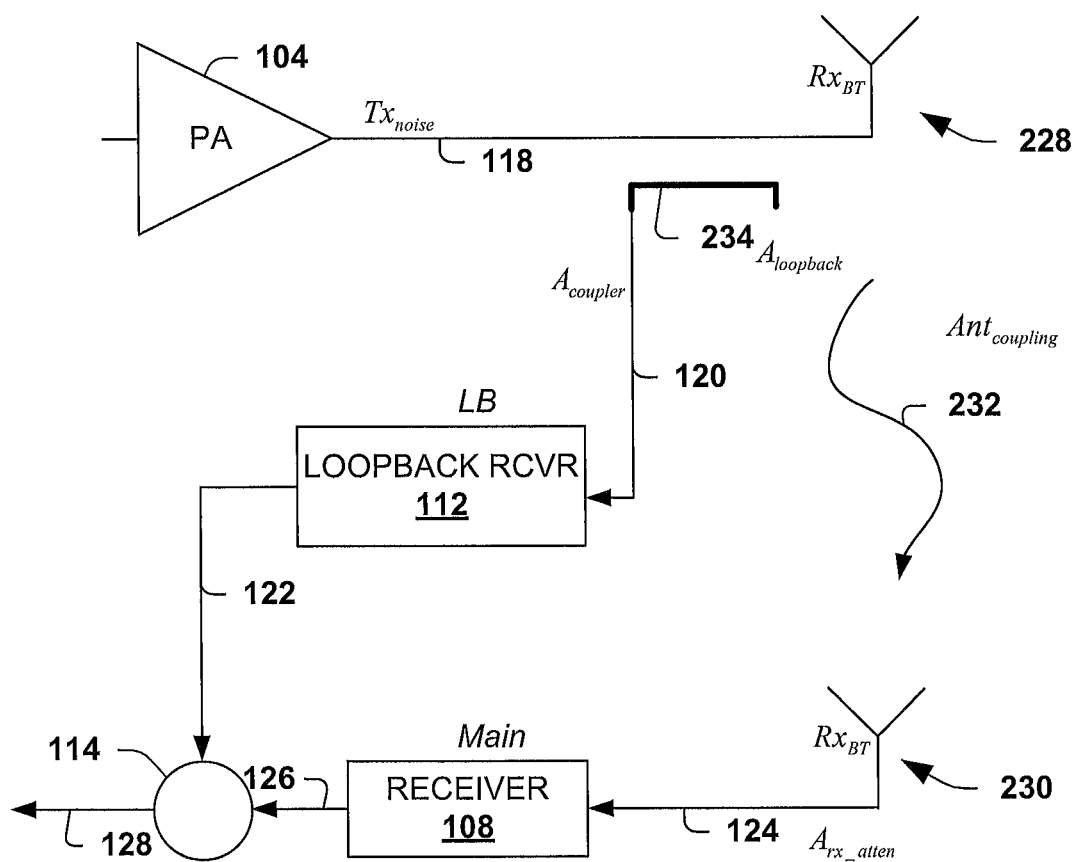
FIG. 2 is a diagram illustrating a communication system utilizing separate antennas and having multiple communication technologies for concurrent communication.

FIG. 2 is a diagram illustrating a communication system 200 utilizing separate antennas and having multiple communication technologies for concurrent communication. The system 200 incorporate noise cancellation in order to mitigate receiver degradation without substantially impacting transmission. The system 200 can be used within or as part of system 100, described above. It is appreciated that components are omitted to simplify and facilitate understanding.

The system 200 includes an amplifier 104, a transmission chain 228, a loopback receiver 112, a noise remover 114, a receiver 108, a receive chain 110, and a coupler 234. The system 200 mitigates receiver degradation by identifying and accounting for noise from a transmit signal or chain directly into the receive signal. As a result, receiver sensitivity and range are improved.

A power amplifier 104 generates a transmit signal 118 according to a transmission communication technology. The transmission technology is typically compliant with a standard, such as Bluetooth, WiFi, UMTS, LTE, and the like. The transmit signal 118 is provided to a transmit chain 228, which is shown with an antenna in this example.

The coupler 234 obtains a coupled signal 120 based on the transmit signal 118. The coupler 234 obtains the coupled signal 120 without substantially altering the transmit signal 118. In one example, the coupler 234 is comprised of one or more inductors and one or more capacitors. The coupler has an associated attenuation, which can be derived or provided. In one example the attenuation is −18 dB. The coupled signal 120 can include coupled components of the transmit signal 118 and components related to the receive signal 124.

The loopback receiver 122 is configured to receive the coupled signal and develop a noise signal 122. The noise signal 122 includes non-linearity noise and direct noise. As described above, the non-linearity noise is based on noise folding of the transmit signal into the receiver 108 due to non-linearity of the receiver 108. The direct noise is noise that is directly introduced into the receiver 108 from the transmit chain 228. It is appreciated that the loopback receiver 122 can also incorporate other noise and/or noise estimates into the noise signal 122.

The receive chain 230 is configured to provide a chain receive signal 124. In this example, the receive chain 230 utilizes a receive antenna, which is distinct from the antenna used for transmission. It is noted that the receive chain 230 is impacted by the transmit chain 228. The impact includes noise from the transmit chain 228 and attenuation.

The receiver 108 is configured to provide a receive signal 126, which is derived from the chain receive signal 124. The receiver 108 can include filtering and the like in order to remove unwanted frequency bands and the like from the chain receive signal 124.

The noise cancellation component 114 is configured to remove the noise from the receive signal 126 in order to generate a wanted receive signal 128. The noise is in the form of the noise signal 122.

The loopback receiver 112 determines or estimates the noise using a suitable technique. In one example, the loopback receiver 112 uses samples of the coupled signal 120 and known value of various parameters of the system 200. In this example, the transmission technology is WiFi and the receive technology is Bluetooth. The receive input attenuation is derived based on the following equation:

$$A_{rx\_atten} = \frac{3 \cdot P_{TX\_noise} - 2 \cdot IIP_3 + 174 - NF_{BT}}{4}$$

The $A_{rx\_atten}$ variable represents needed attenuation of the receive signal 126, $P_{TX\_noise}$ is noise from the transmission chain 228, $IIP_3$ is receiver 108 third order intercept point, and $NF_{BT}$ represents receiver noise. The attenuation of the receive signal noise 232 is accomplished using the noise signal 122 by the cancellation component 114.

It is appreciated that the above values are provided as an example and that other noise determinations and values are contemplated.

Another formula describing generation of the noise signal follows:

$$LB = \left( \frac{Rx_{BT}}{A_{coupler} \cdot A_{loopback} \cdot A_{directivity}} + \frac{Tx_{noise}}{A_{coupler} \cdot A_{loopback}} \right) = \frac{1}{A_{coupler} \cdot A_{loopback}} \cdot \left( \frac{Rx_{BT}}{A_{directivity}} + Tx_{noise} \right)$$

Where LB is the noise signal 122 from the loopback receiver, $Rx_{BT}$ is a required BT signal for the receiver 108 (where the receiver is using Bluetooth), $Tx_{noise}$ is transmission noise present in the transmit signal 118, $A_{coupler}$ is attenuation of the coupler 234, $A_{loopback}$ is attenuation from the loopback receiver 112, and $A_{directivity}$ is directivity attenuation from the coupler 234. The receive signal 126 is represented as follows:

$$Main = \left( \frac{Rx_{BT}}{A_{rx\_atten}} + \frac{Tx}{A_{rx\_atten} \cdot Ant_{coupling}} \right) = \frac{1}{A_{rx\_atten} \cdot Ant_{coupling}} (Ant_{coupling} \cdot Rx_{BT} + Tx_{noise})$$

Here, $A_{rx\_atten}$ represents attenuation at the receiver 108. Lastly, the wanted signal 128 is the receive signal 126 attenuated by the noise signal 122, which is represented by:

$$Main - LB \approx K \left( Rx_{BT} - \frac{Rx_{BT}}{A_{directivity} \cdot Ant_{coupling}} \right) \approx K \cdot Rx_{BT}$$

The above equations show that the transmission noise can be removed and the wanted or required part of the signal is not substantially affected. In one example, the $A_{directivity} \cdot Ant_{coupling}$ is at about 40 dB, which means that subtracting a noise or replica signal that is 40 dB down is lower than a selected or needed signal to noise ratio (SNR).

Figure 3:
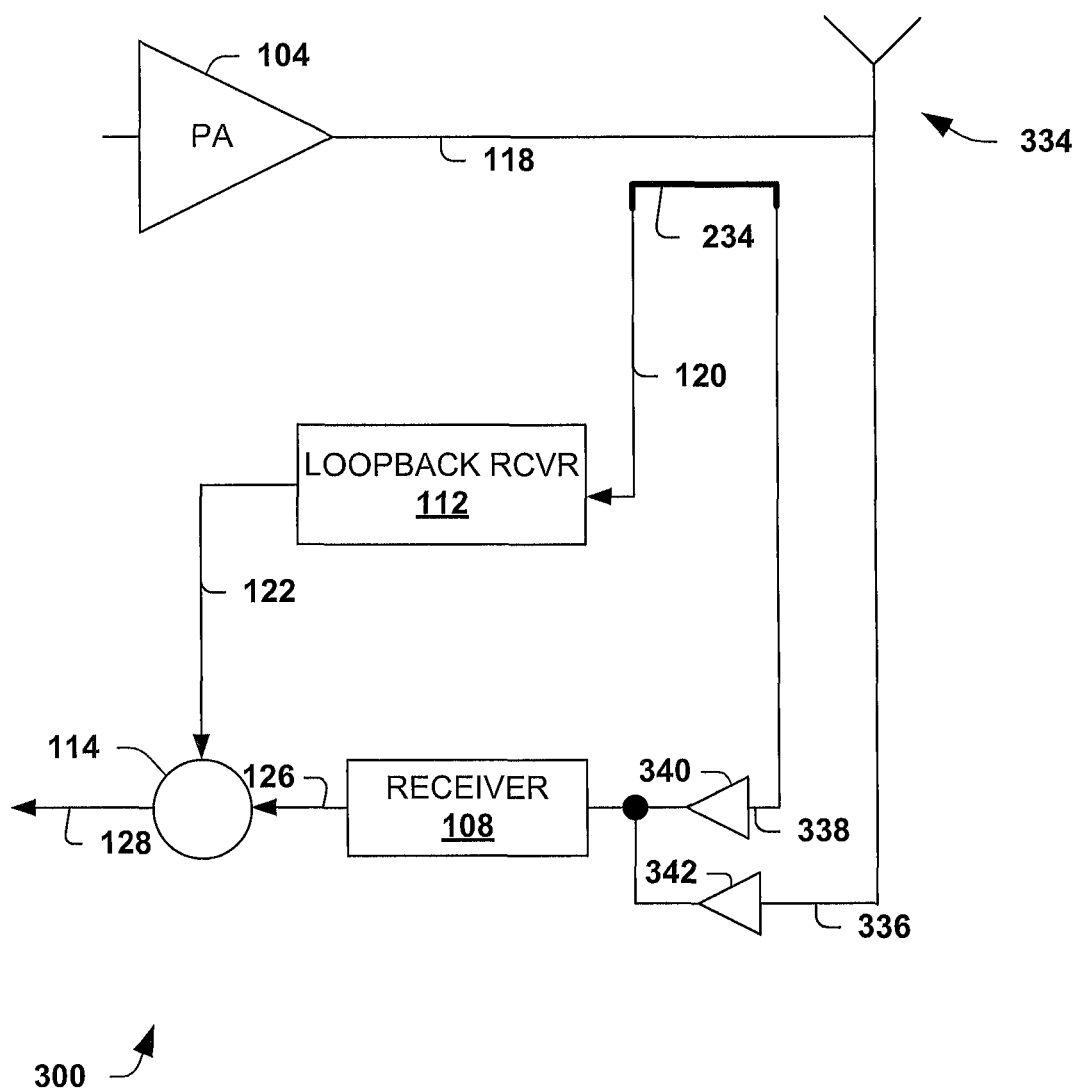
FIG. 3 is a diagram illustrating a communication system utilizing a single antenna and having multiple communication technologies for concurrent communication.

FIG. 3 is a diagram illustrating a communication system 300 utilizing a single antenna and having multiple communication technologies for concurrent communication. The system 300 incorporates noise cancellation or attenuation in order to mitigate receiver degradation without substantially impacting transmission. The system 300 and variations thereof can be incorporated into the system 100, described above. It is also appreciated that components are omitted to simplify and facilitate understanding.

The system 300 includes an amplifier 104, a single transmit/receive chain 334, a loopback receiver 112, a noise remover 114, a receiver 108, a coupler 234, a concurrent receiver 340 and a main receiver 342. The coupler 234 is a dual port coupler that obtains or simulates a separate signal from a separate receive antenna.

The system 300 identifies and accounts for noise introduced by multiple sources, such as noise folding of a transmit signal into a receive signal and direct noise from a transmit signal into a receive signal. By identifying and accounting for the noise, receiver sensitivity is enhanced and range is improved.

A power amplifier 104 generates an amplified transmit signal 118 according to a transmission communication technology. The transmission technology can be compliant with a standard, such as Bluetooth, WiFi, UMTS, LTE, and the like. The transmit signal 118 is provided to the transmit/receive chain 334, which is shown with an antenna used for multiple communications concurrently.

The coupler 234 is a dual port coupler and obtains a coupled signal 120 and a concurrent signal 338. A first port of the coupler 234 provides the coupled signal as described above with regards to FIG. 2. A second port of the coupler 234, referred to as an isolation port, creates or replicates a path similar to the receiver chain 230 of FIG. 2. The coupled signal 120 can include coupled components of the transmit signal 118 and components related to the receive signal 124. The coupler 234 has a selected directivity, such as 20 dB. However, the directivity is also a function of impedance of the antenna of the chain 334, thus, changes in the antenna impedance impact or change the directivity. An example of a suitable dual port coupler that can be used is described below.

The loopback receiver 112 is configured to receive the coupled signal and develop a noise signal 122. The noise signal 122 includes non-linearity noise and direct noise. It is also appreciated that the loopback receiver 112 can also incorporate other noise and/or noise estimates into the noise signal 122.

The concurrent receiver 340 obtains the concurrent signal 338 and simulates a signal portion from a separate antenna at its output. The main receiver 342 receives signal 336 and outputs a main receive signal. The concurrent receiver 340 and the main receiver 342 can be configured ON or OFF, depending on the communications technology and concurrent or non-concurrent operation. For example, using Bluetooth as the receiving communication technology, the main receiver 342 output signal, the main receive signal, is OFF during concurrent operation/mode and the signal the concurrent receiver 340, is ON during the concurrent operation. Thus, the receiver 108 only receives the signal 338 via the concurrent receiver 340. In non-concurrent mode, the signal is also received from the main receiver 342, from the signal 336. Concurrent operation occurs when the transmit signal 118 and the signal 336 are occurring concurrently.

The receiver 108 obtains the chain receive signal and generates a receive signal 126 at its output. The receiver 108 can include filtering and the like to at least partially remove unwanted frequency bands from the chain receive signal.

The noise cancellation component 114 obtains the receive signal 126 and removes or subtracts the noise signal 122 from it to obtain a wanted receive signal 128. The wanted receive signal 128 has a relatively high signal to noise ratio as substantial portions of noise present in the receive signal 126 have been removed by the noise signal 122 by the noise cancellation component 114.

The following equation represents the noise signal 122 and the wanted signal 334 as provided by system 300.

$$LB_2 = \left( \frac{Rx_{BT}}{A_{coupler}} + \frac{Tx_{noise}}{A_{coupler} \cdot A_{directivity}} \right) = \frac{1}{A_{coupler}} \cdot \left( Rx_{BT} + \frac{Tx_{noise}}{A_{directivity}} \right) \approx \text{Main}$$

It can be seen that if the $LB_2$ is similar to Main as described in conjunction with FIG. 2 if Adirectivity is set to around 20 dB.

Figure 4:
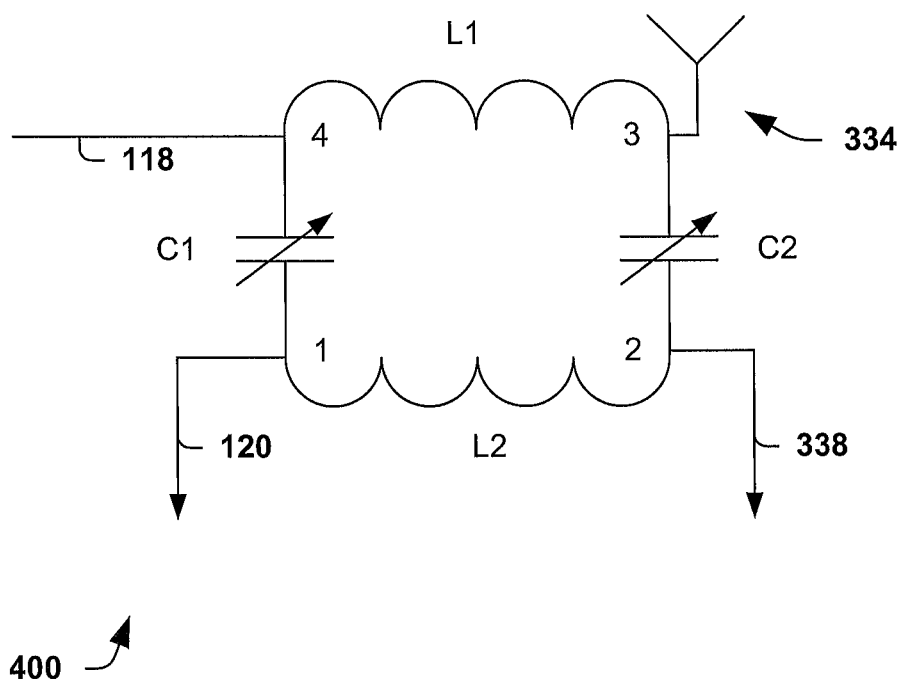
FIG. 4 is a diagram illustrating a dual port coupler that can be utilized in a communication system to facilitate using concurrent communication technologies.

FIG. 4 is a diagram illustrating a dual port coupler 400 that can be utilized in a communication system to facilitate using concurrent communication technologies. The coupler 400 can be utilized as coupler 234.

The dual port coupler 400 includes a first port (1) that generates a coupled signal 120 and a second port (2) that generates a concurrent signal 338. These signals are described in additional detail above. Another port (4) receives a transmit signal 118 and a further port (3) is coupled to a transmit/receive chain 334. Here, the chain 334 is shown using a single antenna for transmission and reception.

The coupler includes a first capacitor C1 between ports 1 and 4, a second capacitor C2 between ports 2 and 3, a first inductor L1 between ports 4 and 3, and a second inductor L2 between ports 1 and 2. Characteristics of the coupler 400 can be adjusted or selected by selecting appropriate values for the capacitors C1 and C2 and the inductors L1 and L2. For example, the capacitors C1 and C2 depend on a voltage standing wave ration (VSWR) of an antenna. The VSWR is a measure of reflected power related to a transmission signal.

Some examples of the characteristics are insertion loss (IL), coupling factor (CF) and directivity. The IL in a first direction equals the power at port 4 divided by the power at port 3. The coupling factor is port 4/port 1 and also port 3/port 2. A first directivity is port 1/port 2 and a second directivity is port 2/port 1.

The characteristics of the coupler 400 can be assigned or determined using calibration procedures. For example, directivity can be calibrated by sending a transmit signal at 334 using WiFi while no signal is being received and tuning the coupler 400 to obtain a defined receiver power of the receive signal 126 using Bluetooth to a threshold value that yields greater than an amount, such as 20 dB directivity.

Figure 5:
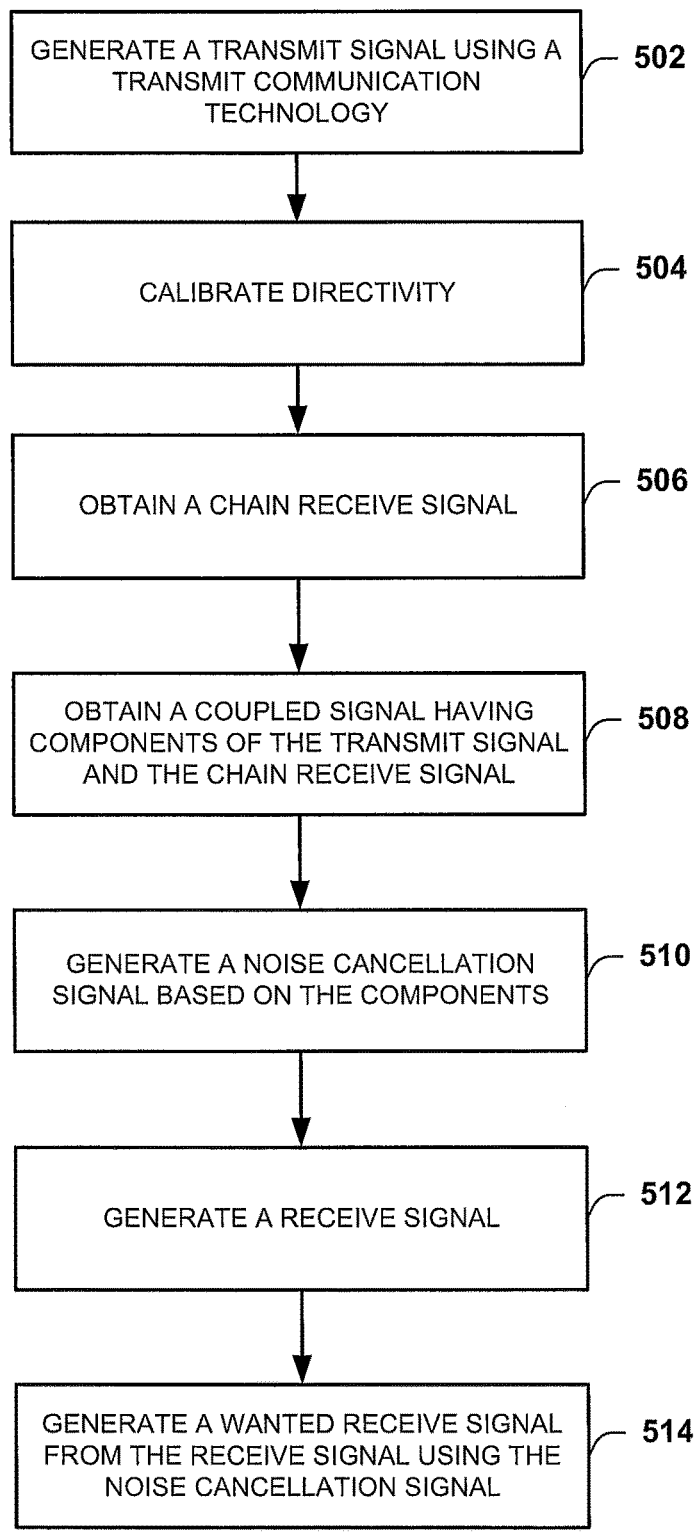
FIG. 5 is a flow diagram illustrating a method utilizing noise cancellation via a coupler to maintain receiver sensitivity and enhance transmission and reception ranges.

FIG. 5 is a flow diagram illustrating a method 500 utilizing noise cancellation via a coupler to maintain receiver sensitivity and enhance transmission and reception ranges.

A transmitter generates a transmit signal using a transmit communication technology at block 502. In one example, the communication technology is based on Bluetooth, WiFi, UMTS, LTE, and the like. A power amplifier, such as described above, can also amplify the transmit signal to facilitate transmission.

Coupler directivity is calibrated at bock 504. The directivity is calibrated by sending a transmit signal without receiving a signal and the coupler is adjusted to obtain a receive power at a receiver, such as receiver 108, to yield a selected amount. In one example, system 300 above is utilized to send a transmit signal 118 via the antenna 334 while the coupler 234 is calibrated to yield power from the receiver 108 of greater than 20 dB. It is noted that the coupler directivity calibration is typically omitted for two antenna examples, such as the system 200 of FIG. 2. Additionally, it is appreciated that other coupler characteristics, such as insertion loss, coupling factors, and the like can also be calibrated at block 504.

A receive chain component obtains a chain receive signal at block 506. In one example, the chain component is configured to utilize an antenna not used by the transmit signal to obtain the chain receive signal. In another example, the chain component is configured to utilizes the same antenna used by the transmit signal.

A coupler derives or obtains a coupled signal at block 508. The coupler is coupled to a transmit chain, receiver chain, and/or a transmit and receive chain in order to obtain the coupled signal. The coupled signal typically includes components of the transmit signal and the chain receive signal. The components includes wanted and unwanted portions.

In one example, the coupler also obtains a concurrent signal when a single chain is used for the transmit signal and the receive signal.

A loopback receiver generates a noise cancellation signal based on the components and characteristics of the system at block 510. The characteristics include coupler characteristics, such as coupler attenuation, directivity, and the like. Further, the characteristics also include transmit to receive attenuation and the like.

A receiver using a receiver communication technology generates a receive signal from the chain signal at block 512. The receiver may include filters and the like to selectively remove portions of the chain signal. The receiver communication technology can be varied from the transmit communication technology. In one example, the receive communication technology is one of Bluetooth, UMTS, WiFi, LTE, and the like.

A noise cancellation component uses the noise cancellation signal to generate a wanted receive signal from the receive signal at block 514. In one example, the noise cancellation component subtracts the noise cancellation signal from the receive signal in order to generate the wanted receive signal. The wanted receive signal has direct noise at least partially removed.

While the methods provided herein are illustrated and described as a series of acts or events, the present disclosure is not limited by the illustrated ordering of such acts or events. For example, some acts may occur in different orders and/or concurrently with other acts or events apart from those illustrated and/or described herein. In addition, not all illustrated acts are required and the waveform shapes are merely illustrative and other waveforms may vary significantly from those illustrated. Further, one or more of the acts depicted herein may be carried out in one or more separate acts or phases.

It is noted that the claimed subject matter may be implemented as a method, apparatus, or article of manufacture using standard programming and/or engineering techniques to produce software, firmware, hardware, or any combination thereof to control a computer to implement the disclosed subject matter (e.g., the systems shown above, are non-limiting examples of circuits that may be used to implement disclosed methods and/or variations thereof). The term "article of manufacture" as used herein is intended to encompass a computer program accessible from any computer-readable device, carrier, or media. Those skilled in the art will recognize many modifications may be made to this configuration without departing from the scope or spirit of the disclosed subject matter.

Examples may include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is a system for concurrent communication using multiple communication technologies. The system includes a loopback receiver, a receiver, and a noise remover component. The loopback receiver is configured to obtain a coupled signal and generate a noise signal from the coupled signal. The noise signal includes receiver noise and direct transmission noise. The receiver is configured to receive a chain receive signal and to provide a receive signal therefrom. The noise remover component is configured to generate a wanted receive signal from the noise signal and the receive signal.

Example 2 is a system including the subject matter of example 1, including or omitting features, where the system includes a transmit chain configured to receive a transmit signal and to provide the coupled signal to the loopback receiver.

Example 3 is a system including the subject matter of examples 1-2, including or omitting features, where the transmit chain introduces the direct transmission noise into the receive signal.

Example 4 is a system including the subject matter of examples 1-3, including or omitting features, where the system includes a power amplifier configured to generate the transmit signal using a transmit communication technology.

Example 5 is a system including the subject matter of examples 1-4, including or omitting features, where the receiver utilizes a receive communication technology different from the transmit communication technology.

Example 6 is a system including the subject matter of examples 1-5, including or omitting features, where the system includes a receive chain configured to generate the chain receive signal.

Example 7 is a system including the subject matter of examples 1-6, including or omitting features, where the system also includes a coupler configured to generate the coupled signal from a transmission chain. The transmission chain receives a transmit signal.

Example 8 is a system including the subject matter of examples 1-7, including or omitting features, where the coupler is also configured to generate the chain receive signal.

Example 9 is a system including the subject matter of examples 1-8, including or omitting features, where the transmit communication technology is WiFi and the receive communication technology is Bluetooth.

Example 10 is a system including the subject matter of examples 1-9, including or omitting features, where the coupler is calibrated to have a selected directivity.

Example 11 is a system including the subject matter of examples 1-10, including or omitting features, where the system includes a transmit/receive chain configured to receive a transmit signal and to provide the chain receive signal.

Example 12 is a system for concurrent communication using multiple communication technologies. The system includes a single transmit/receive chain, a dual port coupler, a loopback receiver, a concurrent receiver, and a main receiver. The single transmit/receive chain is configured to transmit a transmit signal and to receive a chain signal. The dual port coupler is coupled to the transmit/receive chain and has a first port configured to provide a coupled signal and a second port configured to provide a concurrent signal. The loopback receiver is configured to receive the coupled signal and generate a noise signal from the coupled signal. The noise signal includes direct transmission noise. The concurrent receiver is configured to receive the concurrent signal. The main receiver is configured to receive the chain signal.

Example 13 is a system including the subject matter of example 12, including or omitting features, where the system includes a further receiver configured to receive output signals of the concurrent receiver and the main receiver and to generate a receive signal therefrom.

Example 14 is a system including the subject matter of examples 12-13, including or omitting features, where the system includes a noise cancellation component configured to use the noise signal to generate a wanted receive signal from the receive signal from the further receiver.

Example 15 is a system including the subject matter of examples 12-14, including or omitting features, where the transmit signal is of a first communication technology and the receive signal is of a second communication technology. The second communication technology is different than the first communication technology.

Example 16 is a system including the subject matter of examples 12-15, including or omitting features, where the coupler comprises first and second adjustable capacitors and the first and second adjustable capacitors are calibrated to provide selected coupler characteristics.

Example 17 is a system including the subject matter of examples 12-16, including or omitting features, where the coupler is calibrated to provide a selected coupling attenuation and a selected directivity.

Example 18 is a method of operating a concurrent communication system. A transmit signal for transmission is generated using a first communication technology. A chain receive signal is obtained for a second communication technology. A coupler obtains a coupled signal having components of the transmit signal and the chain receive signal. A noise cancellation signal is generated based on the components within the coupled signal and the characteristics of the coupler.

Example 19 is a method including the subject matter of example 18, including or omitting features, where a receive signal is generated from the chain receive signal according to the second communication technology.

Example 20 is a method including the subject matter of examples 18-19, including or omitting features, where the noise cancellation signal is used to remove noise from the receive signal to generate a wanted receive signal.

Although the invention has been illustrated and described with respect to one or more implementations, alterations and/or modifications may be made to the illustrated examples without departing from the spirit and scope of the appended claims. For example, although a transmission circuit/system described herein may have been illustrated as a transmitter circuit, one of ordinary skill in the art will appreciate that the invention provided herein may be applied to transceiver circuits as well.

Furthermore, in particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. The any component or structure includes a processer executing instructions in order to perform at least portions of the various functions. In addition, while a particular feature of the invention may have been disclosed with respect to only one of several implementations, such feature may be combined with one or more other features of the other implementations as may be desired and advantageous for any given or particular application.

Furthermore, to the extent that the terms "including", "includes", "having", "has", "with", or variants thereof are used in either the detailed description and the claims, such terms are intended to be inclusive in a manner similar to the term "comprising".

What is claimed is:

1. A system using multiple communication technologies for communication comprising:
    a loopback receiver configured to estimate a receiver input attenuation based on noise from a transmit chain and receiver noise; and generate a noise signal based on the estimated receiver input attenuation; and
    a noise remover configured to generate a wanted receive signal from the noise signal of the loopback receiver and a receive signal from a receiver.

2. The system of claim 1, wherein the receiver uses a first communication technology and the transmit chain uses a second communication technology, wherein the first communication technology is different than the second communication technology and both the first communication technology and the second communication technology operate in a selected bandwidth.

3. The system of claim 1, wherein the loopback receiver is configured to additionally utilize system characteristics to generate the noise signal.

4. The system of claim 3, wherein the system characteristics include attenuation along paths, phase delays, and time delays.

5. The system of claim 1, further comprising a power amplifier configured to generate a transmit signal for the transmit chain according to a standard compliant communication technology.

6. The system of claim 5, wherein the standard compliant communication technology is selected from a group comprising Bluetooth, WiFi, and LTE.

7. The system of claim 1, wherein the loopback receiver is configured to receive a coupled signal that includes components of a transmit signal and components of the receive signal.

8. The system of claim 1, wherein the generated noise signal includes non-linearity noise and direct noise.

9. The system of claim 1, wherein the receiver is configured to remove unwanted frequency bands from the receive signal.

10. The system of claim 1, further comprising a concurrent receiver and a main receiver, wherein the concurrent receiver is configured to generate a simulated signal and the main receiver is configured to provide a main receive signal and the simulated signal and the main receive signal are combined to generate the receive signal.

11. The system of claim 10, wherein the concurrent receiver is configured to be ON or OFF based on a communication technology and concurrent operation type.

12. A system using multiple communication technologies for communication comprising:
   a dual port coupler having a first port configured to provide a coupled signal of a transmit signal and a second port configured to provide a concurrent signal of the transmit signal;
   a loopback receiver configured to receive the coupled signal and estimate a receiver input attenuation based on transmission noise of a transmit chain and receiver noise of a concurrent receiver from the coupled signal; and generate a noise signal based on the estimated receiver input attenuation;
   wherein the concurrent receiver is configured to receive the concurrent signal;
   a main receiver configured to receive the receive chain signal; and
   wherein the concurrent receiver and the main receiver are activated respectively based on a concurrent mode of operation and a non-concurrent mode of operation.

13. The system of claim 12, further comprising a receiver configured to receive output signals of the concurrent receiver and the main receiver and to generate a receive signal therefrom.

14. The system of claim 13, further comprising a noise cancellation component configured to use the noise signal to generate a wanted receive signal from the receive signal from the receiver.

15. The system of claim 13, wherein the loopback receiver is configured to additionally utilize system characteristics to generate the noise signal.

16. The system of claim 12, wherein the coupler has first and second adjustable capacitors and the first and second adjustable capacitors are sized to provide selected coupler characteristics.

17. The system of claim 12, wherein the coupler introduces a directivity attenuation.

18. A method of operating a communication system, the method comprising:
   generating a transmit signal in a first communication standard for transmission along a transmit chain coupled to a transmitter;
   obtaining a receive chain signal in a second communication standard that is different than the first communication standard along a receiver chain coupled to a receiver for reception;
   estimating a receive attenuation based on noise from a transmit chain and receive chain noise of the receive chain; and
   generating a noise signal downstream of the receiver, the noise signal based on the estimated receive attenuation, components of the transmit signal and the components of the receive chain signal.

19. The method of claim 18, further comprising generating a receive signal from the receive chain signal according to the second communication standard and concurrent with obtaining a coupled signal.

20. The method of claim 19, further comprising using the noise signal to remove noise from the receive signal to generate a wanted receive signal.

* * * * *